(12) United States Patent
Phillips

(10) Patent No.: US 11,352,246 B2
(45) Date of Patent: Jun. 7, 2022

(54) MIXED SUPPLEMENT BEVERAGE VENDING MACHINE

(71) Applicant: Don Phillips, Corpus Christi, TX (US)

(72) Inventor: Don Phillips, Corpus Christi, TX (US)

( * ) Notice: Subject to any disclaimer, the term of this patent is extended or adjusted under 35 U.S.C. 154(b) by 0 days.

(21) Appl. No.: 17/066,206

(22) Filed: Oct. 8, 2020

(65) Prior Publication Data

US 2021/0101793 A1 Apr. 8, 2021

Related U.S. Application Data

(60) Provisional application No. 62/912,370, filed on Oct. 8, 2019.

(51) Int. Cl.
*B67D 1/08* (2006.01)
*B67D 1/00* (2006.01)
*G01G 19/44* (2006.01)

(52) U.S. Cl.
CPC ......... *B67D 1/0888* (2013.01); *B67D 1/0015* (2013.01); *G01G 19/44* (2013.01)

(58) Field of Classification Search
CPC .. B67D 1/0015; B67D 1/0021; B67D 1/0022; B67D 1/0023; B67D 1/0027; B67D 1/0034; B67D 1/0035; B67D 1/0036; B67D 1/0037; B67D 1/0038; B67D 1/0039; B67D 1/0888; G01G 19/44; G01G 19/4146; G01G 19/52
See application file for complete search history.

(56) References Cited

U.S. PATENT DOCUMENTS

| 4,651,862 | A | * | 3/1987 | Greenfield, Jr. | ...... | A47J 31/401 194/214 |
| 6,371,584 | B1 | * | 4/2002 | Alreck | ...... | A47B 67/04 312/235.1 |
| 10,192,037 | B2 | | 1/2019 | Holman et al. | | |
| 10,252,904 | B2 | | 4/2019 | Bertness et al. | | |
| 10,280,060 | B2 | | 5/2019 | Opstal et al. | | |
| 2004/0026447 | A1 | | 2/2004 | Badin et al. | | |
| 2008/0314918 | A1 | | 12/2008 | Nuriely | | |

(Continued)

FOREIGN PATENT DOCUMENTS

DE 10205820 A1 * 8/2003 ............. G01G 19/44

*Primary Examiner* — Donnell A Long
(74) *Attorney, Agent, or Firm* — Boudwin Intellectual Property; Daniel Boudwin

(57) ABSTRACT

A mixed supplement beverage vending machine includes a housing having a base and a front side. The front side includes a display screen and an input mechanism. A user platform extends forwardly from the base. A dispensing mechanism includes an outlet disposed on the front side of the housing. An ingredient sensor is operably connected to a mixing mechanism. A weight sensor is configured to detect the weight of an individual standing on the user platform. The vending machine includes a control module that determines the weight of a via the weight sensor, calculates an ingredient profile based upon the weight of the user, mixes the ingredients of the ingredient profile via the mixing mechanism to form a beverage, and dispenses the beverage via the dispensing mechanism. The vending machine can include a wireless transceiver for remote operation and communications with external wireless devices.

19 Claims, 3 Drawing Sheets

(56) References Cited

U.S. PATENT DOCUMENTS

| | | |
|---|---|---|
| 2011/0168738 A1* | 7/2011 | Nevarez .............. G07F 17/0071 |
| | | 222/129.1 |
| 2013/0112081 A1 | 5/2013 | Nelissen et al. |
| 2016/0090288 A1* | 3/2016 | Givens, Jr. ........... B67D 1/0888 |
| | | 700/283 |
| 2016/0280526 A1 | 9/2016 | O'Laughlin |
| 2017/0096324 A1* | 4/2017 | Dresser .................. B65B 43/48 |
| 2017/0110029 A1* | 4/2017 | Beneduce ............ A61B 5/0537 |
| 2020/0017345 A1* | 1/2020 | Karibandi, Jr. ..... G06F 3/04817 |
| 2020/0100616 A1* | 4/2020 | Herbert ................ A47J 31/405 |
| 2020/0247659 A1* | 8/2020 | Vanassche ........... A61B 5/0537 |

\* cited by examiner

MIXED SUPPLEMENT BEVERAGE VENDING MACHINE

CROSS REFERENCE TO RELATED APPLICATIONS

This application claims the benefit of U.S. Provisional Application No. 62/912,370 filed on Oct. 8, 2019. The above identified patent application is herein incorporated by reference in its entirety to provide continuity of disclosure.

BACKGROUND OF THE INVENTION

The present invention relates to a supplement vending machine. More particularly, the present invention pertains to a supplement vending machine that prepares and dispenses a supplement beverage based on the weight of the user and other parameters if desired.

Many individuals frequent vending machines, which usually contain soda or unhealthy snacks. Consuming such food and beverages from vending machines can be unhealthy and lead to long-term health consequences. Some individuals engage in cardiovascular or anaerobic workout routines, such as weightlifting. Accordingly, some such individuals may frequently consume protein supplements or the like to boost their protein intake to build their muscle mass. Other individuals may consume vitamin supplements to improve their nutrition.

Most vending machines contain sodas having a high sugar content and snacks that are high in sodium and trans fat, which can be harmful to an individual's cardiovascular health. Further, such vending machines fail to provide nutritional value to an individual's diet, especially for an individual who is health-conscious and may desire to build their muscle mass or supplement their diet with vitamins. However, some vending machines exist in the known art that provide protein drinks and other supplements.

The present invention differs from these vending machines in the known art in that the present invention provides a device that comprises a scale that is configured to measure a user's weight and other parameters to provide a supplemental beverage that is created using an ideal mixture of ingredients. The device comprises a logic that is configured to identify an ideal mixture of ingredients or ingredient profile, such as protein powders or the like, and dispense the mixture in accordance to the user's height and weight, thereby providing an automatically prepared and improved dietary supplement to the user through the vending machine.

In light of the devices disclosed in the known art, it submitted that the present invention substantially diverges in design elements from the prior art and consequently it is clear that there is a need in the art for an improvement to existing vending machines. In this regard the present invention substantially fulfills these needs.

SUMMARY OF THE INVENTION

In view of the foregoing disadvantages inherent in the known types of vending machines now present in the prior art, the present invention provides a supplement beverage vending machine that mixes a nutritionally optimal supplement beverage for the user. In one embodiment, the vending machine includes a housing having a base and a front side, the front side comprising a display screen and an input mechanism. A user platform extends forwardly from the base, and a dispensing mechanism having an outlet is disposed on the front side of the housing. An ingredient sensor is operably connected to the mixing mechanism. A weight sensor is configured to detect the weight of an individual standing on the user platform.

The vending machine further includes a control module including a processor, a non-transitory computer readable medium operably connected to the processor, and a logic stored in the non-transitory computer readable medium that, when executed by the processor, causes the vending machine to perform a method. The method includes determining the weight of a user standing on the user platform via the weight sensor, calculating an ingredient profile based upon the weight of the user, the ingredient profile including a particular combination of particular amounts of ingredients, mixing the ingredients of the ingredient profile via the mixing mechanism to form a beverage, and dispensing the beverage via the dispensing mechanism.

One object of the present invention is to provide a supplement beverage vending machine that calculates an ideal beverage composition for the user based on weight and other parameters.

Another object of the present invention is to provide a supplement beverage vending machine that can receive remote instructions from a remote device such as a smartphone or the like.

Other objects, features, and advantages of the present invention will become apparent given the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
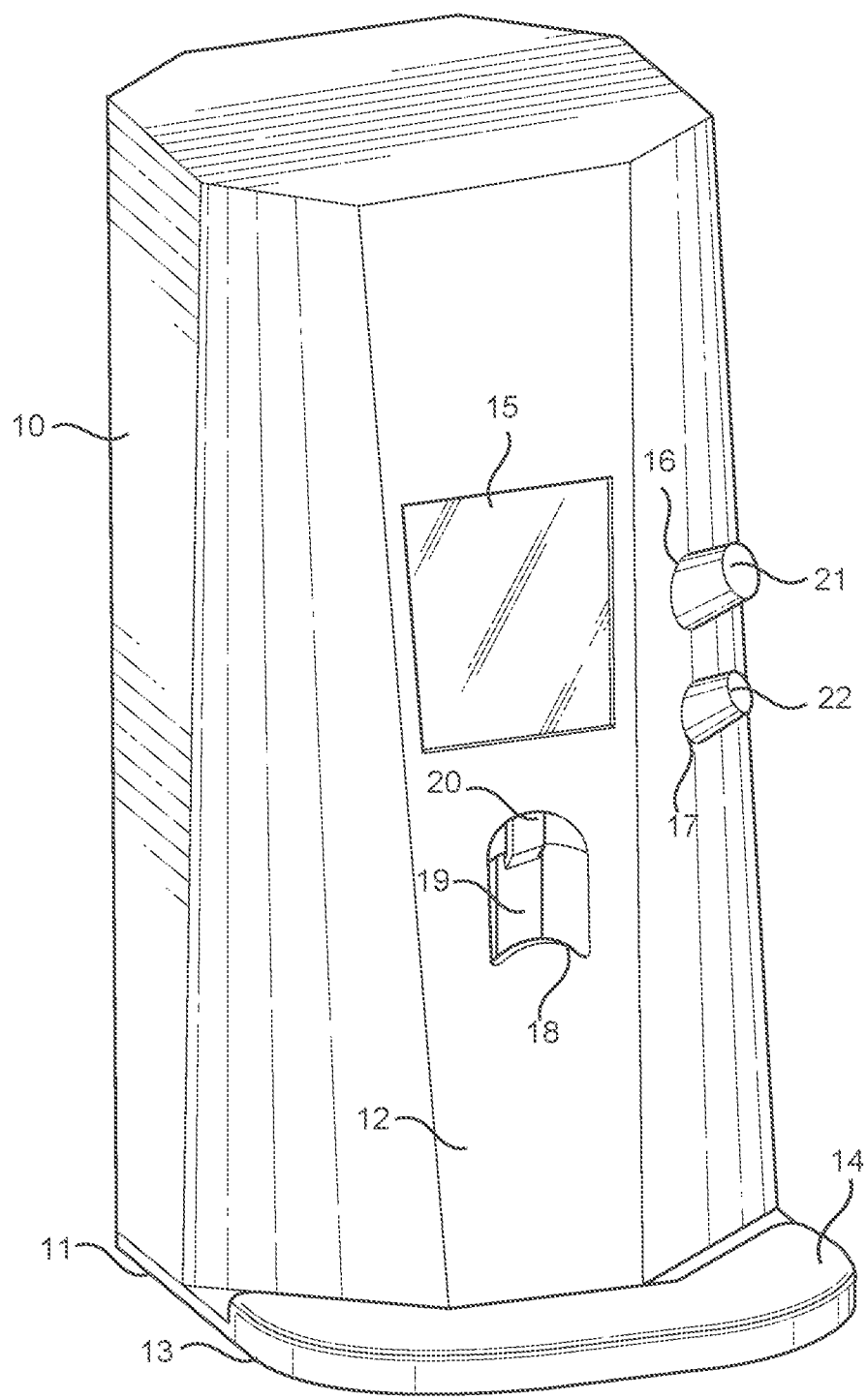
FIG. 1 shows a perspective view of an embodiment of the mixed supplement beverage vending machine.

Reference is made herein to the attached drawings. Like reference numerals are used throughout the drawings to depict like or similar elements of the retractable floor cover. For the purposes of presenting a brief and clear description of the present invention, the preferred embodiment will be discussed as used for calculating ideal ingredients and amounts based on the measured weight of a user, preparing a beverage based on the calculations, and dispensing the beverage for the user. The figures are intended for representative purposes only and should not be considered to be limiting in any respect.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure.

As referred to herein, the term "vending machine" refers to any computing device that includes at least an input mechanism and logic for determining items to be dispensed. The computing device can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such computing devices can also combine custom hard-wired logic, ASICs, or FPGAs with custom programming to accomplish the technique and other features of the present disclosure. The computing devices can include desktop computer systems, laptops, cell phones, tablets, networking devices, or any other device that incorporates hard-wired and/or program logic to implement the techniques and other features of the present disclosure.

Referring now to FIG. 1, there is shown a perspective view of one embodiment of the supplement beverage vending machine. The vending machine generally includes a housing 10 having a base 11 and a front side 12. The front side 12 includes a display screen and input mechanism 15. In the illustrated embodiment, the display screen and input mechanism 15 is a touchscreen display. In other embodiments, the input mechanism can include buttons or other suitable input mechanisms. The front side 12 additionally includes a dispensing mechanism 20 within an opening 19 front side of the housing 10. The opening 19 can receive a container 21, 22 for receiving a dispensed supplement beverage from the dispensing mechanism 20. The containers 21, 22 can be secured within compartments 16, 17 disposed on the housing 10. In the shown embodiment, the opening 19 includes an upwardly curving lip 18 which helps to secure the container 21, 22 within the opening 19 while the beverage is being dispensed to prevent spills from occurring. In some embodiments, the dispensing mechanism 20 is an actuator disposed within the dispensing outlet 42, wherein the dispensing mechanism is configured to only activate upon actuation of the actuator 20 to further prevent accidental spills.

The vending machine further includes a user platform 14 extending forwardly from the base 11. The user platform 14 provides a standing surface for the user and also is operably connected to a weight sensor. Thus, when the user positions themselves on the user platform 14, the vending machine logic is able to determine the user's weight and use that in a calculation to determine the amount of ingredients utilized in the dispensed beverage. In some embodiments, the user platform 14 includes a padded material to enhance the comfort of the user. In other embodiments, the housing 10 can include various other types of sensors, such as a light sensor for detecting the height of the user, as one example. Various types of sensors may be utilized for detecting various parameters, including but not limited to user height, weight, body fat content, heart rate, and the like. These parameters can be utilized when calculating an optimal amount of ingredients and ingredient ratios.

Figure 2:
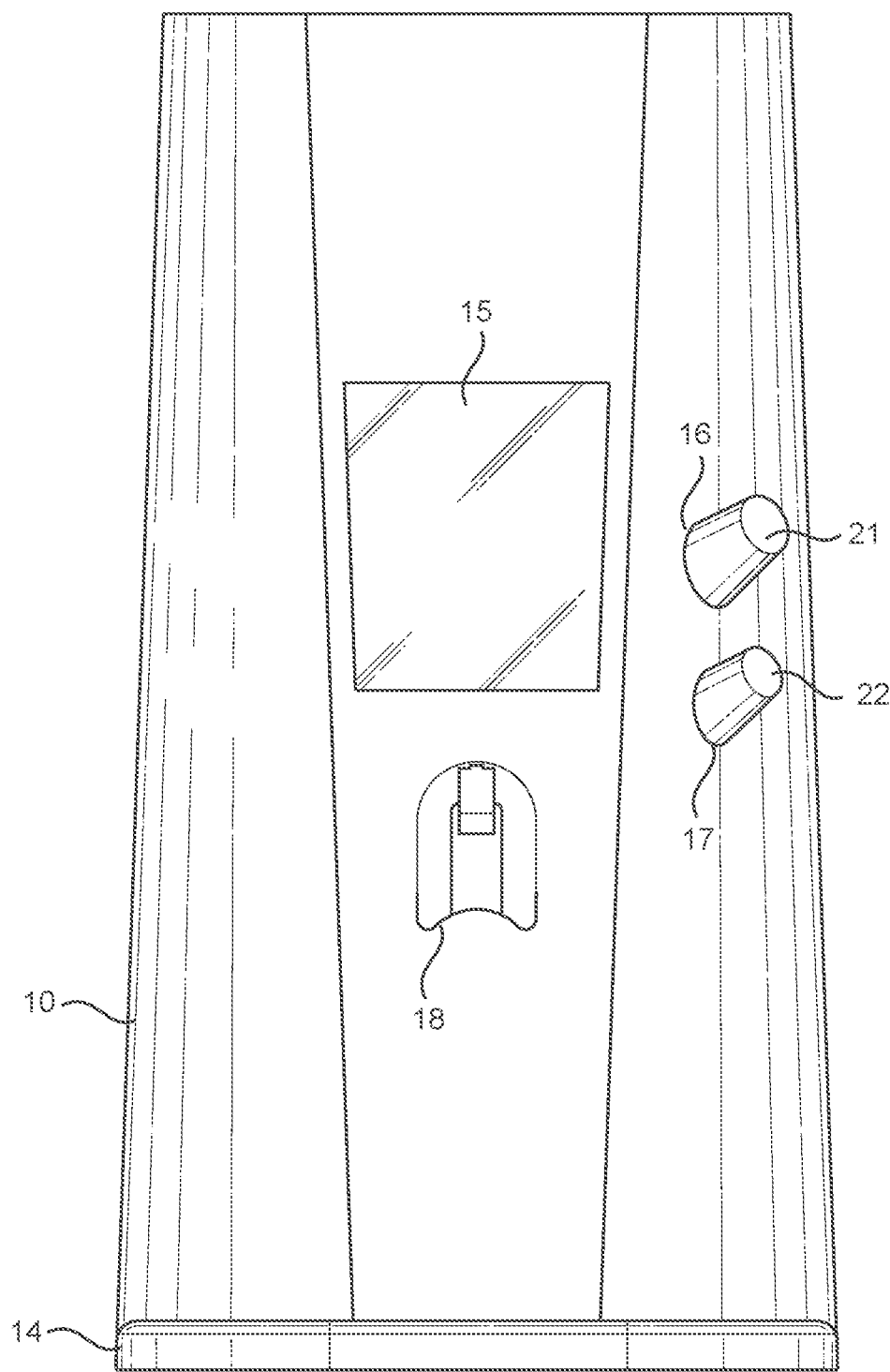
FIG. 2 shows a front elevation view of an alternate embodiment of the mixed supplement beverage vending machine.

Referring now to FIG. 2, there is shown a front elevation view of an alternate embodiment of the supplement beverage vending machine. In the shown embodiment, the housing 10 includes a first pair of compartments 16, 17 having a first configuration disposed on a first side of the display screen 15. The compartments 16, 17 can have various sizes, shapes, and configurations. The differently sized and configured compartments can secure various items, such as differently sized cups 21, 22, lids, or other accessories for the dispensed beverage. In the shown embodiment, the first pair of compartments 16, 17 includes a pair of regular cylindrical cups 21, 22. However, any suitable type of container may be utilized.

Figure 3:
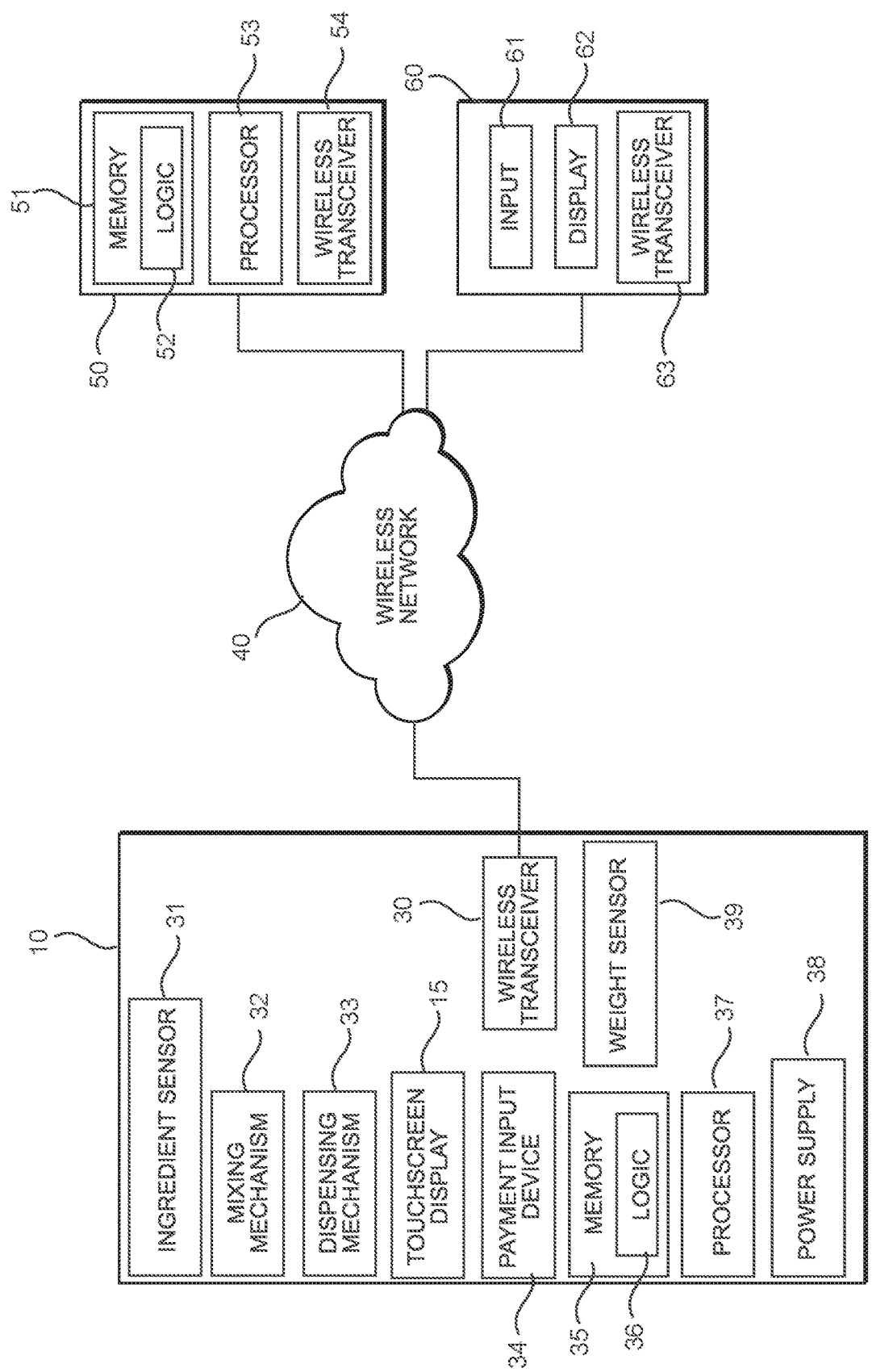
FIG. 3 shows a block diagram of the components of an embodiment of the mixed supplement beverage vending machine.

Referring now to FIG. 3, there is shown a block diagram of the components of an embodiment of the supplement beverage vending machine. The vending machine 10 includes internal components that facilitate the creation of a custom beverage. To that end, the vending machine 10 includes an ingredient sensor 31 which is configured to sense different types and amounts of ingredients. The ingredient sensor 31 can include cameras or other suitable types of sensors. The ingredients themselves may be stored in one or more refillable reservoirs or holders that are positioned within the interior of the vending machine. Examples ingredients may include liquids such as water, milk, almond milk, or the like, and solid ingredients such as protein powders and other ingredients that typically make up a supplement beverage. The ingredient sensor 31 and a mixing mechanism 32 configured to mix the selected ingredients are operably connected to the dispensing mechanism 33.

When the user selects a beverage type choice on the touchscreen display 15, the vending machine begins analyzing user parameters. The weight sensor the weight of the user. In some embodiments, a wireless transceiver 30 is in wireless communication with an external device 60 via a remote network 40. For example, the external device 60 may be a smartphone with a software application that can communicate with the vending machine 10 via the wireless transceiver 30 to send and receive instructions. In one embodiment, the user can select ingredients, choose from different drink types, and transmit their personal parameters such as height, weight, and the like to the memory 35 of the vending machine, such that the parameters can be utilized by the mixing mechanism 32 to form the ideal beverage composition. The wireless transceiver 30 can further communicate with a remote server 50. The remote server 50 can include user profiles with stored parameters and preferences, and may be accessed via a website or other access mechanism.

In operation, the user may stand on the platform to activate the weight sensor 39, which activates the control module including a processor 37, a non-transitory computer readable medium operably connected to the processor such as a memory 35, and a logic 36+ stored in the non-transitory computer readable medium that, when executed by the processor, causes the vending machine to perform a method. First, the logic 36 determines determining the weight of a user standing on the user platform via the weight sensor 36. The logic can accumulate various other parameters determined either by integrated sensors within the vending machine or external sources, such as the user's smartphone, for example. The logic 36 then calculates an ingredient profile based upon the weight of the user, such that the ingredient profile including a particular combination of particular amounts of ingredients. The user can also input or transmit dietary preferences and make other choices for the final beverage. As one example, the user may input a desired macronutrient ratio for the beverage. Once the optimal ingredient ratio is calculated based on the user parameters, the mixing mechanism 32 mixes the ingredients of the ingredient profile to form a beverage. The dispensing mechanism 33 can then be activated to dispense the completed beverage into an awaiting container. In this way, the user can completely customize the contents beverage while the vending machine's internal logic is capable of calculating an ideal amount and ratio of ingredients based on the caloric needs of the user and other parameters.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vending machine comprising:
   a housing having a base and a front side, the front side comprising a display screen and an input mechanism;
   a user platform extending forwardly from the base;
   a dispensing mechanism having an outlet disposed on the front side of the housing;
   an ingredient sensor operably connected to a mixing mechanism;
   a weight sensor configured to detect the weight of an individual standing on the user platform;
   a light sensor configured to detect the height of an individual standing on the user platform;
   a control module including a processor, a non-transitory computer readable medium operably connected to the processor, and a logic stored in the non-transitory computer readable medium that, when executed by the processor, causes the vending machine to perform a method, the method comprising:
   determining the weight of a user standing on the user platform via the weight sensor;
   determining the height of a user standing on the user platform via the light sensor;
   calculating an ingredient profile based upon the weight and the height of the user, the ingredient profile including a particular combination of particular amounts of ingredients;
   mixing the ingredients of the ingredient profile via the mixing mechanism to form a beverage; and
   dispensing the beverage via the dispensing mechanism.

2. The vending machine of claim 1, wherein the display screen and the input mechanism comprise a touchscreen display.

3. The vending machine of claim 1, further comprising an exterior compartment configured to removably support a container therein.

4. The vending machine of claim 1, further comprising a wireless transceiver configured to send and receive information over a wireless network.

5. The vending machine of claim 4, wherein the input mechanism can be utilized remotely via an external user device communicating wirelessly with the wireless transceiver.

6. The vending machine of claim 4, wherein the wireless transceiver is configured to transmit user information received from the input mechanism to a remote database.

7. The vending machine of claim 1, wherein the dispensing mechanism includes an actuator disposed within the dispensing outlet, wherein the dispensing mechanism is configured to only activate upon actuation of the actuator.

8. The vending machine of claim 1, wherein the standing platform includes a padded material.

9. The vending machine of claim 1, wherein the dispensing outlet includes an upwardly curving front lip.

10. The vending machine of claim 1, further comprising a payment input mechanism configured to accept either electronic based or paper money payment methods.

11. A vending machine comprising:
    a housing having a base and a front side, the front side comprising a display screen and an input mechanism;
    a first pair of compartments having a first configuration disposed on a first side of the display screen;
    a user platform extending forwardly from the base;
    a dispensing mechanism having an outlet disposed on the front side of the housing;
    an ingredient sensor operably connected to a mixing mechanism;
    a weight sensor configured to detect the weight of an individual standing on the user platform;
    a light sensor configured to detect the height of an individual standing on the user platform;
    a control module including a processor, a non-transitory computer readable medium operably connected to the processor, and a logic stored in the non-transitory computer readable medium that, when executed by the processor, causes the vending machine to perform a method, the method comprising:
    determining the weight of a user standing on the user platform via the weight sensor;
    determining the height of a user standing on the user platform via the light sensor;
    calculating an ingredient profile based upon the weight and the height of the user, the ingredient profile including a particular combination of particular amounts of ingredients;
    mixing the ingredients of the ingredient profile via the mixing mechanism to form a beverage; and
    dispensing the beverage via the dispensing mechanism.

12. The vending machine of claim 11, wherein the display screen and the input mechanism comprise a touchscreen display.

13. The vending machine of claim 11, further comprising a wireless transceiver configured to send and receive information over a wireless network.

14. The vending machine of claim 13, wherein the input mechanism can be utilized remotely via an external user device communicating wirelessly with the wireless transceiver.

15. The vending machine of claim 13, wherein the wireless transceiver is configured to transmit user information received from the input mechanism to a remote database.

16. The vending machine of claim 11, wherein the dispensing mechanism includes an actuator disposed within the dispensing outlet, wherein the dispensing mechanism is configured to only activate upon actuation of the actuator.

17. The vending machine of claim 11, wherein the standing platform includes a padded material.

18. The vending machine of claim 11, wherein the dispensing outlet includes an upwardly curving front lip.

19. The vending machine of claim 11, further comprising a payment input mechanism configured to accept either electronic based or paper money payment methods.

\* \* \* \* \*